United States Patent [19]

Bost

[11] 4,072,643
[45] Feb. 7, 1978

[54] FLAME-RETARDED POLYOLEFIN BLEND WITH GOOD BALANCE OF PROPERTIES

[75] Inventor: Howard W. Bost, Bartlesville, Okla.

[73] Assignee: Phillips Petroleum Company, Bartlesville, Okla.

[21] Appl. No.: 663,007

[22] Filed: Mar. 2, 1976

[51] Int. Cl.$^2$ .............................. C08K 5/34; C08K 5/51
[52] U.S. Cl. .................... 260/23 H; 260/45.95 L; 260/45.95 P; 260/45.8 NT; 260/32.6 PQ; 260/33.4 PQ; 260/897 A
[58] Field of Search ..... 260/45.8 NT, 23 H, 33.4 PQ, 260/32.6 PQ, 897 A, 45.95 P, 45.95 L

[56] References Cited

U.S. PATENT DOCUMENTS

| | | | |
|---|---|---|---|
| 3,137,672 | 6/1964 | Lehane | 260/897 |
| 3,256,367 | 6/1966 | Jayne | 260/897 |
| 3,730,929 | 5/1973 | Breza | 260/45.7 R |
| 3,803,065 | 4/1974 | Arai et al. | 260/33.4 PQ |
| 3,936,416 | 2/1976 | Brady | 260/45.8 NT |
| 3,936,420 | 2/1976 | Gray | 260/45.8 NT |

OTHER PUBLICATIONS

Chemistry and Uses of Fire Retardants – by Lyons, John Wiley and Sons, Inc. N.Y.C. 1970, pp. 256 to 272.

*Primary Examiner*—V. P. Hoke

[57] ABSTRACT

Flame retardant polyolefin compositions are prepared by blending polypropylene, polyethylene and a rubbery ethylene-propylene copolymer, and a cured intumescent flame retardant. These compositions are characterized as having a low brittleness temperature and an acceptable balance of properties.

10 Claims, No Drawings

FLAME-RETARDED POLYOLEFIN BLEND WITH GOOD BALANCE OF PROPERTIES

This invention relates to flame retardant polyolefin compositions.

Polyolefins, in general, have the drawback of high flammability. They can be made flame retardant by incorporating therein halogenated organic materials. However, such materials, when heated to combustion temperatures, release gases which can be toxic to human life.

Cured intumescent flame retardants have been developed as alternatives for the halogenated flame retardants. These intumescent flame retardants, upon heating, promote the formation of char which protects the polymer by providing insulation from heat and oxidative degradation. However, it has been found that such cured intumescent flame retardants, when employed in an amount sufficient to prevent flaming or dripping when exposed to fire had an adverse effect on the physical properties of the polyolefins. What is desired is a flame-retarded polyolefin composition having a good balance of properties.

Accordingly, it is an object of this invention to provide a flame retarded polymer composition having a good balance of properties.

Other objects, aspects and advantages of the present invention will be apparent to those skilled in the art from a reading of the following disclosure and appended claims.

In accordance with the present invention there is provided a flame retarded polymeric composition comprising a polymer blend consisting essentially of 40 to 50 weight percent of a polypropylene having a melt flow in the range of 10 to 15 g/10 min., 25 to 35 weight percent of a polyethylene having a melt index in the range of 15 to 20 g/10 min. and 20 to 30 weight percent of a substantially amorphous ethylene/propylene copolymer having a Mooney Viscosity ML (1 + 8 min.) at 260° F in the range of 55 to 70; and from 10 to 50 parts per 100 parts of the above polymer blend (hereinafter expressed as php, parts per 100 parts of polymer) of a cured intumescent flame retardant.

The flame-retarded polymeric composition of this invention has a brittleness temperature below about 5° C (40° F), a melt flow of 2 to 6.5 g/10 min. (ASTM D-1238-70, Condition L) and has otherwise acceptable properties. Those skilled in the art will recognize that, for outdoor applications in particular, a low brittleness temperature is important. It is also important to maintain a reasonable melt flow to ensure good processability, particularly in injection molding.

The polypropylenes useful in the compositions of this invention are normally solid polymers of propylene having a melt flow according to ASTM D-1238-73, Condition L, in the range of 10 to 15 g/10 min. The polypropylenes have a density in the range of about 0.90 to 0.91 g/cc. Other desirable properties of the polypropylene include:

Melting Point: about 340° F (171° C)
Flexural Modulus: about 250,000 psi
Hardness, Shore D: about 73

The polyethylenes useful in the compositions of this invention are normally solid polymers of ethylene having a melt index according to ASTM D-1238-73, Condition E, in the range of 15 to 20 g/10 min. The polyethylenes have a density in the range of about 0.95 to 0.96 g/cc. and a flexural modulus of about 200,000 psi.

The substantially amorphous ethylene/propylene copolymers useful in the compositions of this invention are normally solid copolymers having a Mooney Viscosity ML (1 + 8 min.) at 260° F in the range of 55-70 and a density of about 0.86 g/cc. By the term substantially amorphous, it is meant that the ethylene/propylene copolymers are less than about 20 percent crystalline. It is preferred that these copolymers be completely non-crystalline. These co-polymers are also hereinafter referred to as ethylene-propylene rubbers (EPR).

The three components of the polymer blend can be mixed together in any order using conventional hot processing equipment well known in the plastics art. For example, batch type equipment such as a Banbury mixer or a two-roll mill can be employed, or a finely ground mixture can be compounded in a screw extruder. The cured intumescent flame retardant can be incorporated into the composition at any time using conventional hot processing equipment, although it is presently preferred to incorporate the flame retardant into the final polymeric blend.

The cured intumescent flame retardant useful in the compositions of this invention is a highly crosslinked polymer comprising the reaction product of a phosphorus oxide of the formula $$P_2O_5 \cdot xH_2O$$

wherein $x$ is a number having a value of 0 to 3; a saturated acyclic polyol having 5 to 15 carbon atoms and 4 to 8 hydroxyl groups per molecule; and a nitrogen compound.

Examples of suitable phosphorus oxides useful in preparing the cured intumescent flame retardant include, for example, phosphorus pentoxide, orthophosphoric acid, and condensed phosphoric acids having about 70 to 99, preferably about 80 to 90, weight percent phosphorus pentoxide. Such condensed phosphoric acids can be prepared by any technique known in the art, such as by reacting phosphorus pentoxide and phosphoric acid.

Examples of suitable polyols useful in preparing the cured intumescent flame retardant include sorbitol, mannitol, pentaerythritol, dipentaerythritol, and tripentaerythritol. Preferably, in addition to the carbon, hydrogen and hydroxyl groups, the only other functional groups in these polyols are a maximum of two ether linkages per molecule.

Melamine is generally employed as the nitrogen compound in preparing the cured intumescent flame retardants. It will be apparent to those skilled in the art that compounds such as dicyandiamide, urea, dimethylurea, and the like can be used in place of the melamine.

In a presently preferred embodiment the phosphorus oxide is a mixture of phosphoric acid and phosphorus pentoxide, the nitrogen compound is melamine and the polyol is pentaerythritol. These ingredients can be combined as follows:

| Ingredient | Parts by Weight per 100 Parts by Weight of Reaction Mixture | |
|---|---|---|
| | Broad | Preferred |
| Phosphoric Acid | 0.5-25 | 5-15 |
| Phosphoric Pentoxide | 10-75 | 15-50 |
| Pentaerythritol | 5-30 | 10-25 |
| Melamine | 10-70 | 15-50 |

Optionally, the cured intumescent flame retardant can also include a compound of the formula $R-Y_z$, having 2 to 24, preferably 6 to 20, carbon atoms per molecule, wherein Y is selected from the group consisting of —OH, —COOH and —NR'$_2$, z is a number having a value of 1 or 2, R is a hydrocarbyl radical having a valence of z selected from the group consisting of alkyl, cycloalkyl, and alkoxy, and R' is —H or —R.

It was found that addition of 0.5 to 20 parts, preferably 2 to 10 parts of the compound $R-Y_z$ to the flame retardant, prior to curing, improves the color of the cured flame retardant. In the absence of this compound, the cured flame retardant has a dark color ranging from a dark tan to dark brown. When this compound, hereinafter called a color improving compound, or color improver, is incorporated into the flame retardant, the cured product has a lighter color.

Examples of suitable color improvers include 2-ethylhexanol, 4-tetradecanol, 1-octadecanol, triethylene glycol, ethylene glycol, cyclohexanol and the like; acetic acid, pentanoic acid, adipic acid, decanoic acid, stearic acid, dodecanedioic acid, eicosanoic acid, cyclopentanecarboxylic acid, and the like; dibutylamine, 2-ethylhexylamine, octadecylamine, hexamethylethylenediamine, 2-octylcyclohexylamine, decyldimethylamine, and the like; and mixtures thereof.

As used herein and in the claims, the term "cured intumescent flame retardant" is intended to mean a flame retardant comprising the reaction product of a phosphorus oxide, a saturated acyclic polyol, a nitrogen compound and, optionally, a color improving compound, as described above, which is cured by heating to evolve gaseous products without depleting the intumescent, i.e., gas generating, capability of the flame retardant.

To prepare the cured intumescent flame retardant, the above-described ingredients are combined in any suitable manner, at a temperature and for a time sufficient to provide a composition which, when incorporated into a thermoplastic resin, will impart flame retardant properties to that resin. Generally, preparation of the flame retardant can be conveniently carried out as follows:

Step I: The phosphoric acid and phosphorus pentoxide are mixed, allowing an autogenous increase in temperature resulting from the exothermic reaction. The reaction period can vary broadly from about 5 to 20 minutes.

Step II: The pentaerythritol, the color improver, and about 5–15 percent of the melamine are added, with stirring, to the mixture produced in Step I, at a temperature in the range of 75°–150° C for about 0.5–8 hours, preferably about 110°–130° C for about 0.5–4 hours.

Step III: The balance of the melamine is added, with stirring, to the mixture produced in Step II. The melamine can be added continuously or intermittently over a period of about 0.1–3 hours or more, at a temperature of about 180°–300° C, preferably about 0.1–1.5 hours at about 200°–250° C.

Step IV: The reaction mixture obtained from Step III is cured by continued heating, with stirring, at a temperature of about 200°–300° C for about 1–5 hours, preferably 240°–270° C for about 2–3 hours.

Step V: The reaction mixture from Step IV is cooled, then pulverized to a suitable particle size.

Exclusion of oxygen from the reaction mixture during the curing Step IV and the cooling and pulverizing Step V generally results in a further improvement in color quality of the finished flame retardant. Oxygen can be excluded by maintaining an inert atmosphere, such as nitrogen or helium, or by maintaining a reduced pressure over the reaction mixture. It is presently preferred that the entire preparation of the intumescent flame retardant composition be carried out in the absence of oxygen.

Other conventional additives such as pigments, fillers, antioxidants, and the like can also be incorporated into the final composition. Additionally, other flame retardant compositions or flame retardant adjuvants such as antimony oxide, ethylene diamine dihydrobromide, triphenylphosphine oxide, bis(cyclohexenyl) ethylene hexabromide and the like can also be present.

The following examples illustrate the invention:

EXAMPLE I

Preparation of the Cured Intumescent Flame Retardant (IFR)

Phosphoric acid (0.4 mole) was added in a slow stream to phosphorus pentoxide (1.0 mole) with stirring in a 2-liter flask. A moderate flow of nitrogen was kept over the mixture at all times. A mixture of pentaerythritol (0.6 mole), melamine (0.12 mole) and color improver, as noted below, was added in small increments to the mixed acid. This mixture was stirred while the temperature was raised to and held at about 120° F in a fluidized sand bath for about 3 hours. Additional melamine (1.08 moles) was added in small portions with stirring as the temperature was raised over a period of about 1 hour to 250° C. The temperature was held at 250°–265° C for 2–3 hours. During this time as crosslinking continued in the product the mixture became very viscous and difficult to stir.

When the sample was adequately cooled, generally after standing overnight, the flame retardant was removed from the flask and pulverized in a Waring blender. The material was screened through an 80 mesh sieve and was then ready for compounding into the polymer blend.

EXAMPLE II

Preparation of Polymer Blends

Polypropylene having a melt flow of about 12 g/10 min. and a density of about 0.908 g/cc., polyethylene having a melt index of about 18 g/10 mm. and a density of about 0.955 g/cc., and an amorphous ethylene/propylene copolymer (EPR) having a Mooney viscosity range of about 55–70 (Vistalon 606, available commercially from Exxon Chemical Company, Houston, Tex.), were blended together on a hot roll mill in the amounts shown in Table I. The hot roll mill temperature ranged from 160° to 185° C, generally 168° to 178° C. The cured intumescent flame retardant was then added to the blend. After the flame retardant had been completely added to the blend, milling was continued for about 4.5 minutes to disperse the flame retardant throughout the polymer blend.

| The following tests were conducted: | |
|---|---|
| Test for: | ASTM number: |
| Melt Flow (Melt index) | D 1238-73, Condition E for polyethylene, Condition F for polypropylene |
| Flexural Modulus | D 790-71 |
| Izod Impact Strength | D 256-72a |
| Brittleness Temperature | D 746-73 |

Tests for Flammability

1. UL-94, Vertical Burning Test: A complete discussion of this test procedure is described in Modern Plastics, October 1970, page 92 and is outlined in subsequent volumes of the Modern Plastics Encyclopedia, e.g., 1973-74, page 655A.

Briefly, a sample 5 × ½ inch, of a thickness near that of the application for which the flame retarded polymer is being considered, is used. The sample is held vertically and ignited at its lower end with a "standard" flame for 10 seconds. The flame is removed and the period of time of continued burning, or glowing of the char, is measured. If the burning, or glowing, goes out within 30 seconds, the flame is applied again for 10 seconds. The average burning time of the two burns is noted. If burning continues for 25 seconds or more, it is classified as "Fail". If burning ceases in less than 25 seconds, but releases flaming particles or drops, it is classified V-2. If burning ceases in less than 25 seconds and no flaming particles or drops are released, the material is classified V-1. If burning ceases in 5 seconds or less and no flaming particles or drops are released, the material is classified V-0.

Earlier UL-94 specifications called for 1/16 - and ⅛ inch-thick test specimens. In the tests shown below, only ⅛ inch-thick specimens were used. Further, three applications of flame rather than two applications, as specified, were used. While some variance from the results that would otherwise have been obtained by strict adherence to the specified test might have resulted, limited comparisons indicated that testing was probably somewhat more severe and that any errors would likely be on the conservative side.

2. Oxygen Index Test: Also referred to as the Limiting Oxygen Index (L.O.I.). This test is a measure of the minimum amount of oxygen required in an oxygen-nitrogen mixture that will just sustain combustion of a vertically mounted specimen that has been ignited at its upper end. A more detailed description of the test is found in Modern Plastics, November 1966, page 141, and in brief summaries in subsequent volumes of Modern Plastics Encyclopedia, e.g., 1973-74, page 655A. L.O.I. values above about 25 are generally desired.

Results of testing of the flame retarded polymer blends are given in Table I, below. IFR-A contains 0.055 mole octadecanol; IFR-B contains 0.055 mole octadecanol and 0.1 mole triethylene glycol; IFR-C contains 0.1 mole triethylene gylcol; IFR-D had no other components; and IFR-E contained 0.053 mole stearic acid.

Table I

| Run No. | Blend Component, Weight Percent | | | IFR, php. | UL-94 Rating | L.O.I. % | Melt Flow | Brittleness Temp., °F | Flexural Modulus, psi × 10$^{-3}$ | Izod Impact Strength, Notched ft. lbs. | Other Ingredients, php. |
|---|---|---|---|---|---|---|---|---|---|---|---|
| | PP | PE | EPR | | | | | | | | |
| 1 | 42.5 | 30 | 27.5 | none | Fail | — | 3.5 | −59 | 84 | 5.7 | — |
| 2 | 40 | 35 | 25 | A 40 | V-1 | 24.3 | 4.8 | −13 | 197 | 4.5 | — |
| 3 | 42.5 | 30 | 27.5 | A 40 | V-0 | 26.2 | 2.9 | 7 | 139 | 4.3 | — |
| 4 | 42.5 | 30 | 27.5 | A 40 | V-0 | 27.8 | 3.6 | −13 | 162 | 4.7 | — |
| 5 | 42.5 | 30 | 27.5 | A 42.5 | V-0 | 29.3 | 3.7 | −21 | 177 | 5.2 | — |
| 6 | 42.5 | 30 | 27.5 | A 45 | V-0 | 27.3 | 3.6 | −21 | 212 | 5.0 | — |
| 7 | 45 | 30 | 25 | A 30 | V-1 | 25.7 | 5.5 | 18 | 183 | 4.1 | — |
| 8 | 45 | 30 | 25 | A 50 | V-0 | 26.5 | 4.7 | 13 | 204 | 3.3 | — |
| 9 | 47.5 | 32.5 | 20 | A 30 | V-1 | 23.5 | 6.7 | 31 | 203 | 3.2 | — |
| 10 | 42.5 | 30 | 27.5 | A 38$^a$ | V-0 | 26.5 | 2.4 | 11 | 144 | 4.2 | — |
| 11 | 42.5 | 30 | 27.5 | A 40 | V-0 | 26.0 | 5.3 | −13 | 157 | 5.0 | BCE-6Br, 3 php$^d$ |
| 12 | 45 | 30 | 25 | A 35 | V-0 | 25.4 | 5.8 | 25 | 184 | 4.2 | BCE-6Br, 3php$^d$ |
| 13 | 45 | 30 | 25 | A 40 | V-0 | 25.4 | 5.9 | 21 | 201 | 3.8 | BCE-6Br, 3 php$^d$ |
| 14 | 45 | 30 | 25 | A 35 | V-0 | 25.4 | 6.3 | 33 | 214 | 3.4 | TPPO, 5 php$^e$ |
| 15 | 45 | 30 | 25 | B 35 | V-0 | 23.5 | 5.6 | 21 | 259 | 5.5 | Sb$_2$O$_3$, 2.5 php |
| 16 | 45 | 30 | 25 | B 40 | V-0 | 26.0 | 6.1 | 26 | 205 | 5.5 | Sb$_2$O$_3$, 2.5 php |
| 17 | 45 | 30 | 25 | B 45 | V-0 | 25.4 | 5.8 | 33 | 233 | 3.3 | Sb$_2$O$_3$, 2.5 php |
| 18 | 42.5 | 30 | 27.5 | B 42.5 | V-0 | 25.0 | 3.3 | 33 | 154 | 4.5 | — |
| 19 | 42.5 | 30 | 27.5 | B 42.5 | V-0 | 27.5 | 3.1 | 25 | 142 | 3.9 | — |
| 20 | 42.5 | 30 | 27.5 | B 45 | V-0 | 26.5 | 3.6 | 34 | 164 | 3.9 | — |
| 21 | 42.5 | 30 | 27.5 | C 45 | V-0 | 27.0 | 3.7 | 38 | 159 | 3.9 | — |
| 22 | 76.5$^b$ | 8.5$^c$ | 15 | D 30 | Fail | 22.4 | 1.9 | >RT | 204 | 1.0 | — |
| 23 | 76.5$^b$ | 8.5$^c$ | 15 | D 30 | Fail | 23.3 | 0.5 | >RT | 194 | 2.7 | — |
| 24 | 45$^b$ | 30$^c$ | 25 | E 30 | Fail | 27.0 | 0.7 | −24 | 148 | 8.5 | — |

$^a$IFR contains only 0.037 mol of octadecanol
$^b$Melt flow 5.0
$^c$Melt index 0.15
$^d$BCE-6Br Bis(cyclohexenyl) ethylene hexabromide
$^e$TPPO Triphenylphosphine oxide Examination of the above data shows that the flame retarded compositions of runs 2-14 have acceptable balances of properties. In contrast, the polymer blend of run 1, having no flame retardant, has a low flexural modulus, thus upsetting the desired balance of properties and, of course, is quite flammable.

For comparison, the polymer blends of runs 22-24 were prepared using polypropylene and polyethylene having melt flows outside the scope of this invention. Additionally, the component ratios of the blends of runs 22 and 23 are outside the scope of this invention. The flame-retarded blends of runs 22-24 fail the flammability test and have unacceptable melt flows. The blends of runs 22 and 23 additionally have brittleness temperatures above room temperature and unacceptable impact test values.

EXAMPLE III

For comparison, the effect of adding a cured intumescent flame retardant to a blend containing 81.5 weight percent polypropylene and 18.5 weight percent of a 60/40 ethylene-propylene copolymer is shown below. The effect of adding the IFR to a blend containing 42.5 percent polypropylene, 30 percent polyethylene and 27.5 percent EPR, according to the invention, is also shown:

Table II

| | Run | | | |
|---|---|---|---|---|
| | 25 | 26 | 27 | 28 |
| | Propylene/Ethylene-Propylene Copolymer | | Invention Blend | |
| IFR, php | none | 30 | none | 30 |
| UL-94 | fail | V-0 | fail | V-0 |
| Melt flow g/10 min. | 4 | 3.5 | 3.5 | 3.6 |
| Brittleness, °F | −15 | RT | −59 | −13 |
| Flexural Modulus psi × 10$^{-3}$ | 170 | 216 | 84 | 162 |
| Notched Izod ft. lb. | 2.5 | 0.7 | 5.7 | 4.7 |

It can be seen that without the flame retardant, the blends of runs 25 and 27 each have good brittleness temperatures, good melt flow and good notched Izod impact strength, but the invention blend has a low flexural modulus. However, with the flame retardant the polypropylene-copolymer blend (Run 26) has a brittleness temperature at about room temperature (about 68° F) making the blend unacceptable for outdoor applications, while the invention blend has a brittleness temperature of −13° F, as good as the polypropylene-copolymer blend without the IFR. The Izod impact strength of the polypropylene-copolymer blend with the IFR fell to an unacceptable level while the invention blend with the IFR retained its good impact strength. Additionally, the invention blend, with the IFR has a flexural modulus approximately equal to that of the propylene-copolymer blend without the IFR.

Reasonable variations and modifications, which will be apparent to those skilled in the art, can be made in this invention without departing from the spirit and scope thereof.

What is claimed is:

1. A flame-retarded polymeric composition comprising:
   a. a polymer blend consisting essentially of from 40 to 50 weight percent of a polypropylene having a melt flow in the range of 10 to 15 g/10 min. and a density in the range of 0.90 to 0.91 g/cc., 25 to 35 weight percent of a polyethylene having a melt flow index in the range of 15-20 g/10 min. and a density in the range of 0.950-0.960, and 20 to 30 weight percent of a substantially amorphous ethylene/propylene copolymer having a Mooney Viscosity ML (1 + 8 min.) at 260° F in the range of 55-70 and a density of about 0.86 g/cc., having incorporated therein
   b. from 10 to 50 parts per 100 parts of said blend of a cured intumescent flame retardant comprising the reaction product of a phosphorus oxide of the formula $P_2O_5 \cdot xH_2O$, wherein $x$ is a number having a value of 0 to 3; a saturated acyclic polyol having from 5 to 15 carbon atoms and from 4 to 8 hydroxyl groups per molecule; a nitrogen compound selected from the group consisting of melamine, dicyandiamide, urea and dimethylurea; and, optionally, a color improving compound of the formula $R-Y_z$, having from 2 to 24 carbon atoms per molecule, wherein Y is selected from the group consisting of —OH, —COOH —NR'$_2$, $z$ is a number having a value of 1 or 2, R is a hydrocarbyl radical having a valence of $z$ selected from the group consisting of alkyl, cycloalkyl and alkoxy, and R' is —H or —R; which reaction product is thereafter cured by heating.

2. The composition of claim 1 wherein said polymer blend consists essentially of from 40 to 45 weight percent of said polypropylene, 27.5 to 32.5 weight percent of said polyethylene and from 25 to 30 weight percent of said copolymer.

3. The composition of claim 1 wherein said polymer blend consists essentially of 42.5 weight percent of said polypropylene, 30 weight percent of said polyethylene and 27.5 weight percent of said copolymer.

4. The composition of claim 1 wherein said intumescent flame retardant is present in an amount ranging from 30 to 50 parts per 100 parts of said blend.

5. The composition of claim 1 wherein said cured intumescent flame retardant is prepared by:
   a. initially reacting from about 5 to about 30 parts of said polyol with from about 10 to about 75 parts of said phosphorus oxide compound in the presence of about 5 to about 15 percent of an approximate amount of 10 to 70 parts of said nitrogen compound and, optionally, from 0.5 to 20 parts of said color improving compound;
   b. adding to the resulting mixture of step (a) the balance of said nitrogen compound over a period of about 0.1 to 3 hours or more at a temperature in the range of about 180°-300° C; and
   c. thereafter curing by heating the reaction mixture of step (b).

6. The composition of claim 5 wherein said cured intumescent flame retardant comprises the reaction product of 0.5 to 25 weight percent phosphoric acid, 10 to 75 weight percent phosphorus pentoxide, 5 to 30 weight percent pentaerythritol and 10 to 70 weight percent melamine.

7. The composition of claim 6 wherein said color improving compound is octadecanol.

8. The composition of claim 6 wherein said color improving compound is a mixture of octadecanol and triethylene glycol.

9. The composition of claim 6 wherein said color improving compound is triethylene glycol.

10. The composition of claim 6 wherein said color improving compound is stearic acid.

* * * * *